(12) United States Patent
Saimen et al.

(10) Patent No.: US 11,520,719 B2
(45) Date of Patent: Dec. 6, 2022

(54) MEMORY CONTROLLER, MEMORY SYSTEM, AND CONTROL METHOD OF MEMORY SYSTEM

(71) Applicant: KIOXIA CORPORATION, Tokyo (JP)

(72) Inventors: Tamio Saimen, Kanagawa (JP); Kenji Sakaue, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/190,757

(22) Filed: Mar. 3, 2021

(65) Prior Publication Data

US 2021/0365393 A1   Nov. 25, 2021

(30) Foreign Application Priority Data

May 20, 2020   (JP) .............................. JP2020-087856

(51) Int. Cl.
*G06F 13/16* (2006.01)
*G06F 13/42* (2006.01)

(52) U.S. Cl.
CPC ...... *G06F 13/1673* (2013.01); *G06F 13/4282* (2013.01); *G06F 2213/16* (2013.01)

(58) Field of Classification Search
CPC ............. G06F 13/1673; G06F 13/4282; G06F 2213/16
See application file for complete search history.

(56) References Cited

U.S. PATENT DOCUMENTS

| | | | |
|---|---|---|---|
| 7,222,226 B1* | 5/2007 | Lepak | G06F 9/3842 |
| | | | 712/225 |
| 7,373,452 B2 | 5/2008 | Suh | |
| 8,209,503 B1 | 6/2012 | Smith | |
| 2005/0071570 A1* | 3/2005 | Takasugi | G06F 12/0862 |
| | | | 711/137 |
| 2009/0100206 A1* | 4/2009 | Wang | G06F 13/1673 |
| | | | 710/112 |
| 2011/0131346 A1* | 6/2011 | Noeldner | G06F 13/1673 |
| | | | 710/52 |
| 2014/0025771 A1* | 1/2014 | Tanaka | H04N 21/2323 |
| | | | 709/213 |
| 2019/0164615 A1* | 5/2019 | Kim | G11C 7/1015 |
| 2019/0179690 A1* | 6/2019 | Giovannini | G11C 8/12 |

* cited by examiner

*Primary Examiner* — Henry Tsai
*Assistant Examiner* — Harry Z Wang
(74) *Attorney, Agent, or Firm* — Kim & Stewart LLP

(57) ABSTRACT

A memory controller includes a host interface circuit connectable to a host device by a bus conforming to a memory card system specification, a data buffer circuit including a buffer memory, a tag information generation circuit configured to generate tag information associated with a command received by the host interface circuit, and a first register in which the tag information generated by the tag information generation circuit is stored, and a second register into which the tag information stored in the first register is copied after the command is fetched from the host interface circuit for processing. When a read request is made from the host interface circuit to the data buffer circuit, the data buffer circuit returns read data stored in the buffer memory upon confirming that the tag information stored in the first register and the tag information stored in the second register match each other.

15 Claims, 4 Drawing Sheets

MEMORY CONTROLLER, MEMORY SYSTEM, AND CONTROL METHOD OF MEMORY SYSTEM

CROSS-REFERENCE TO RELATED APPLICATION(S)

This application is based upon and claims the benefit of priority from Japanese Patent Application No. 2020-087856, filed May 20, 2020, the entire contents of which are incorporated herein by reference.

FIELD

An embodiment described herein relates generally to a memory controller, a memory system, and a control method of a memory system.

BACKGROUND

A memory card in which a NAND flash memory is embedded, is known.

DETAILED DESCRIPTION

Figure 1:
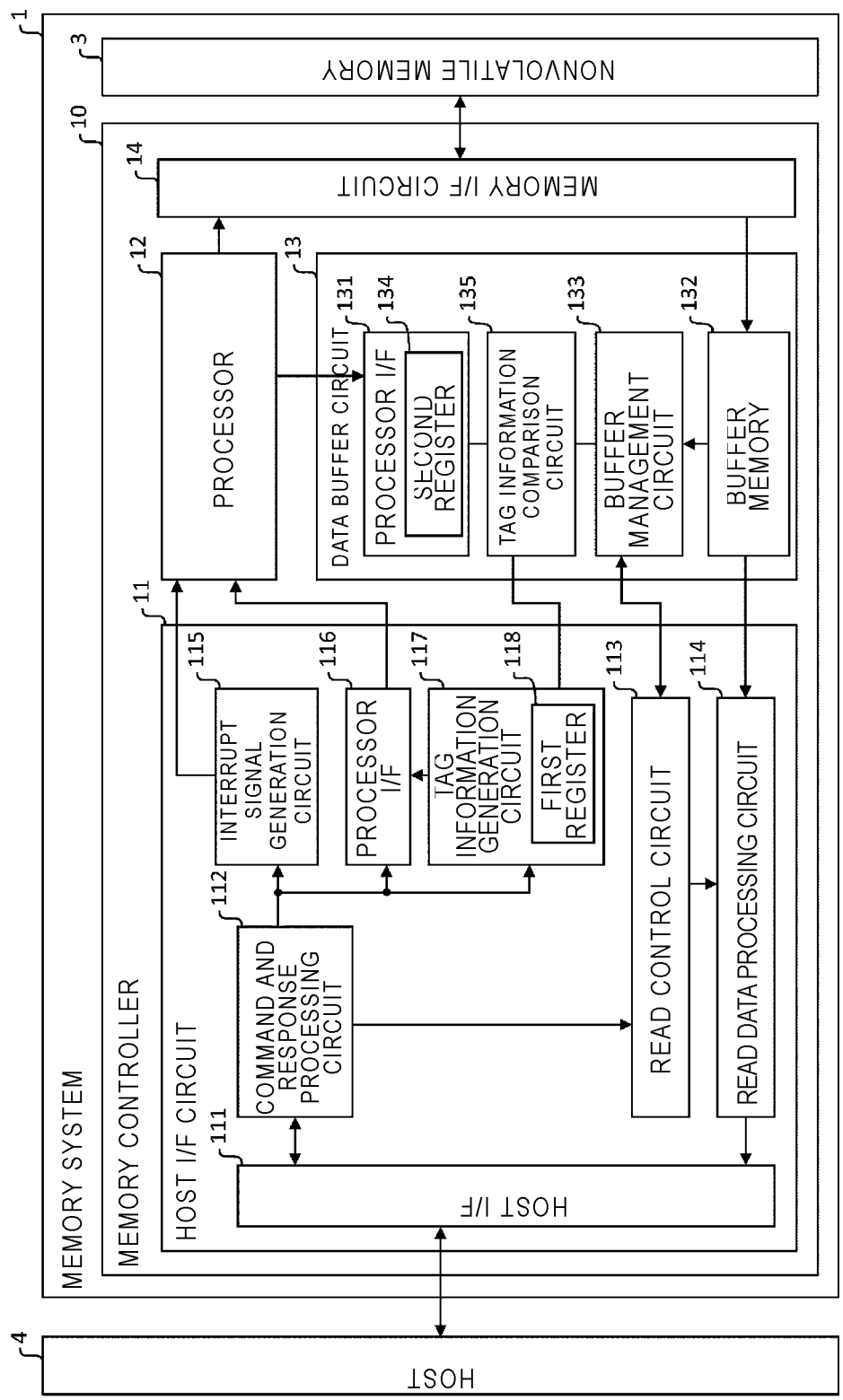
FIG. 1 is a block diagram illustrating an example of a configuration of a memory system according to an embodiment.

Embodiments provide a memory controller, a memory system, and a control method of a memory system that can improve reliability of an operation.

In general, according to one embodiment, a memory controller includes a host interface circuit configured to be connected to a host device by a bus conforming to a memory card system specification, a data buffer circuit including a buffer memory, a tag information generation circuit configured to generate tag information associated with a command received by the host interface circuit from the host device, and a first register in which the tag information generated by the tag information generation circuit is stored, and a second register into which the tag information stored in the first register is copied after the command is fetched from the host interface circuit for processing. When a read request is made from the host interface circuit to the data buffer circuit, the data buffer circuit returns read data stored in the buffer memory upon confirming that the first register and the tag information stored in the second register match each other.

Hereinafter, an embodiment of the present disclosure will be described with reference to the drawings. In the description of the drawings described below, the same or similar portions are denoted by the same or similar reference numerals. However, the drawings are schematic, and a size of each component in a block diagram may be different from an actual size.

A memory system according to the embodiment will be described with reference to FIG. 1. FIG. 1 is a block diagram illustrating an example of a configuration of the memory system according to the embodiment.

As shown in FIG. 1, a memory system 1 according to the embodiment includes a memory controller 10 and a nonvolatile memory 3. The memory system 1 can be connected to a host 4, and FIG. 1 shows a state where the memory system 1 is connected to the host 4. The host 4 is an electronic device such as a personal computer or a portable terminal. The memory system 1 that can be connected to the host 4 is a storage device including a memory and a memory controller, for example, a memory card such as an SD® card.

The nonvolatile memory 3 according to the present embodiment is, for example, a NAND memory. However, the nonvolatile memory 3 is not limited to the NAND memory, and can be other types of nonvolatile memory, such as flash memory, FeRAM, and MRAM. In a case of a NAND memory, data is written and read in a unit called a page. For example, one page is about 2K bytes. Erasing of data is performed in a block unit with a plurality of pages, for example, 64 pages as one unit.

The memory controller 10 controls writing to the nonvolatile memory 3 in accordance with a write request from the host 4. In addition, the memory controller 10 controls reading of data from the nonvolatile memory 3 in accordance with a read request from the host 4. The memory controller 10 includes a host interface (I/F) circuit 11, a processor 12, a data buffer circuit 13, and a memory interface (I/F) circuit 14. The host I/F circuit 11, the processor 12, the data buffer circuit 13, and the memory I/F circuit 14 are connected to each other via wiring. The host 4 and the host I/F circuit 11 are connected via an external bus. The external bus communicates according to a standard conforming to a memory card system specification. Examples of the memory card system specification include a serial peripheral interface (SPI) bus and an SD bus.

The host I/F circuit 11 outputs the write request, the read request, user data, and the like which are received from the host 4 to the bus. The host I/F circuit 11 transmits user data read from the nonvolatile memory 3, a response from the processor 12, and the like to the host 4.

Examples of the processor 12 include a central processing unit (CPU) and a micro-processing unit (MPU).

The memory I/F circuit 14 is connected to the nonvolatile memory 3 via a memory control unit (not shown). The memory control unit performs an operation of writing data or the like to the non-volatile memory 3 and an operation of reading data or the like from the non-volatile memory 3. The write operation and the read operation are performed based on an instruction from the processor 12. Alternatively, the memory I/F circuit 14 may be connected to the nonvolatile memory directly.

The processor 12 controls each circuit in the memory controller 10. When a command is input from the host 4 via the host I/F circuit 11, the processor 12 performs control in accordance with the command. The processor 12 manages a storage area on the nonvolatile memory 3 (corresponding to physical address on the nonvolatile memory 3) of the user data to be written to and read from the host 4 by using, for example, an address conversion table.

The data buffer circuit 13 includes a memory area for temporarily storing user data, write data, read data, and the like. For example, a semiconductor memory such as a DRAM is provided in the data buffer circuit 13.

Next, a more detailed configuration of the memory controller 10 will be described.

As shown in FIG. 1, the host I/F circuit 11 includes a host I/F 111, a command and response processing circuit 112, a read control circuit 113, a read data processing circuit 114, an interrupt signal generation circuit 115, a processor I/F 116, and a tag information generation circuit 117. The tag information generation circuit 117 includes a first register 118.

The host I/F circuit 11 communicates with the host 4 through the host I/F 111. When a command is received via the host I/F 111, the command and response processing circuit 112 returns a response corresponding to a control state in the memory controller 10 to the host via the host I/F 111. The command and response processing circuit 112 is connected to the read control circuit 113, the interrupt signal generation circuit 115, the processor I/F 116, and the tag information generation circuit 117, and transmits a control signal necessary for an operation of each circuit.

When the host I/F circuit 11 receives a read command, the read control circuit 113 makes a read request to the data buffer circuit 13.

The read data processing circuit 114 operates when the read data is to be output from the data buffer circuit 13 to the host 4. When the read data is to be output from the data buffer circuit 13 to the host 4, the read data is output via the read data processing circuit 114 and the host I/F 111.

When the command and response processing circuit 112 receives a command via the host I/F 111, the interrupt signal generation circuit 115 generates an interrupt signal and notifies the processor 12 of a command reception interrupt.

The processor I/F 116 is used as an I/F when the processor 12 fetches a detail of the command.

When the host I/F circuit 11 receives a command from the host 4, the tag information generation circuit 117 generates tag information associated with the command and stores the tag information in the first register 118. The command used to generate the tag information according to the embodiment may be limited to the read command, or may not be limited in particular to the read command.

The first register 118 stores the tag information generated by the tag information generation circuit 117. Every time the command is received from the host 4, the tag information generation circuit 117 generates the tag information and stores the tag information in the first register 118. That is, the tag information associated with the latest command is updated and stored in the first register 118.

The data buffer circuit 13 includes a processor I/F 131, a buffer memory 132, a buffer management circuit 133, and a tag information comparison circuit 135. The processor I/F 131 includes a second register 134.

The processor I/F 131 is used as an interface when the data buffer circuit 13 communicates with the processor 12. In the present embodiment, the second register 134 is provided inside the processor I/F 131, but, in other embodiments, may be provided outside the processor I/F 131.

The read data requested by the read command is read from the nonvolatile memory 3 and stored in the buffer memory 132.

When an amount of the read data read into the buffer memory 132 from the nonvolatile memory 3 exceeds a predetermined amount, the buffer management circuit 133 notifies the read control circuit 113 that the read data stored in the buffer memory 132 is readable. For example, 512 bytes is selected as the predetermined amount. A read request from the read control circuit 113 and a response that read data stored in the buffer memory 132 is readable (e.g., buffer ready response) from the buffer management circuit 133 are carried out each time the predetermined amount of data has completed accumulating in the buffer memory 132. Although 512 bytes is given as an example of the predetermined amount, the data amount of the predetermined amount is not limited to 512 bytes, and may be any data amount other than 512 bytes. On the contrary, until the amount of read data read into the buffer memory 132 exceeds the predetermined amount, the read control circuit 113 is notified that the read data stored in the buffer memory 132 is not readable.

The tag information stored in the first register 118 is copied and stored in the second register 134. Copying of the tag information is performed by the processor 12.

When preparation of the read data in the buffer memory 132 is complete, the tag information comparison circuit 135 checks whether the tag information stored in the first register 118 and the tag information stored in the second register 134 match each other. A comparison of the tag information is performed every time the read request is made from the read control circuit 113.

In the embodiment, the tag information are pieces of information that can be stored in the first register 118 and the second register 134, respectively, and that the tag information comparison circuit 135 can check if they match each other. For example, the tag information generation circuit 117 may be a counter, and the tag information may be a count value that is updated each time the counter receives a command. The tag information may be a read address of the read command received from the host 4 or time information generated by the tag information generation circuit 117.

Figure 2:
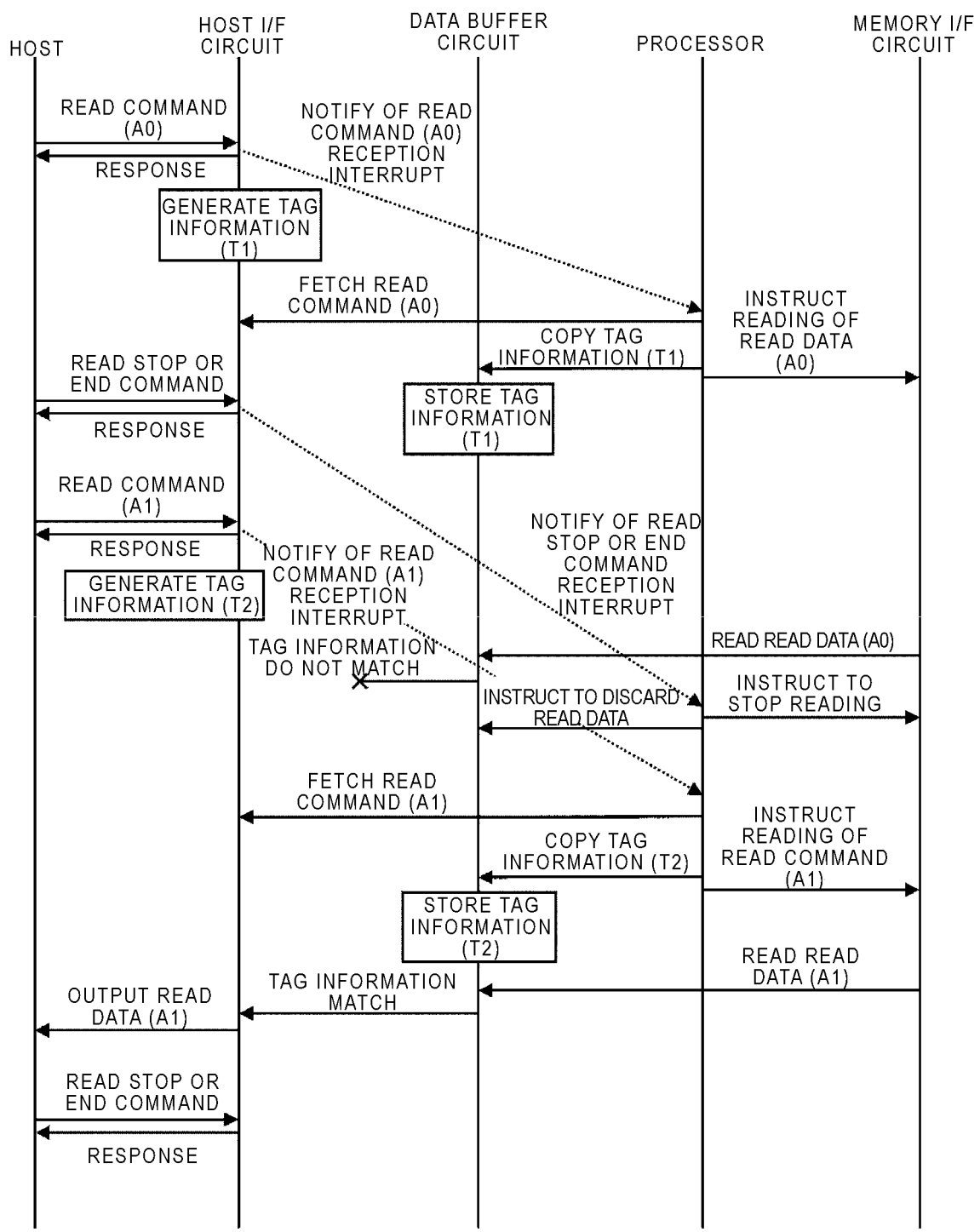
FIG. 2 is a diagram illustrating an operation sequence of the memory system according to the embodiment.

Next, an operation of the memory system 1 according to the embodiment will be described with reference to FIG. 2. FIG. 2 is a diagram illustrating an operation sequence of the memory system according to the embodiment.

First, when the external host 4 transmits the read command to the memory system 1, the host I/F circuit 11 receives the read command. Here, the read command is a command of the host 4 to the memory system 1 to read data at a particular address in the memory system 1. In the following description, a case of reading data at an address "A0" and an address "A1" will be described as an example. The read commands for reading the data at the address "A0" and the address "A1" are referred to as a read command (A0) and a read command (A1), respectively. When receiving the read command (A0) via the host I/F 111, the command and response processing circuit 112 returns a response corresponding to a control state in the memory controller 10 to the host 4 via the host I/F 111. When the host I/F circuit 11 receives the read command (A0), the tag information generation circuit 117 generates new tag information (T1) and stores the tag information (T1) in the first register 118. For example, when the count value (N) is used for the tag information (T1), the tag information generation circuit 117 generates a value of "N=1" and stores the value in the first register 118. Similarly, when the read address is used for the tag information (T1), the tag information generation circuit 117 extracts a value of "A0" from the read command (A0) and stores the value in the first register 118. When the time information is used for the tag information (T1), the tag information generation circuit 117 generates information of "t1" and stores the information in the first register 118. In the following description, a case where the count value (N) is used for the tag information (T1) will be described.

Next, the read control circuit 113 starts a data read request to the buffer management circuit 133. Based on a comparison result of the tag information comparison circuit 135, the buffer management circuit 133 transfers the read data from the nonvolatile memory 3 stored in the buffer memory 132 to the read data processing circuit 114, and sends a response signal (for the data read request) as to whether the read data stored in the buffer memory 132 is readable (buffer ready response) to the read control circuit 113 to perform data read control. Therefore, the read control circuit 113 is in a waiting state until an amount of the read data that is read corresponding to the read command (A0) exceeds the predetermined amount or a read stop or end command is received from the host 4. Therefore, at this point, data transfer is not performed from the buffer memory 132 to the read data processing circuit 114. In the following description, the read data corresponding to the read command (A0) is referred to as read data (A0). Similarly, the read data corresponding to the read command (A1) is referred to as read data (A1). A sequence example shown in FIG. 2 shows a case where the host I/F circuit 11 receives the read stop or end command or receives the next read command (A1) before the read data (A0) corresponding to the read command (A0) is taken into the buffer memory 132.

The interrupt signal generation circuit 115 notifies the processor 12 of a read command (A0) reception interrupt. The processor 12 confirms the notification of the read command (A0) reception interrupt.

Next, the processor 12 fetches a detail of the read command (A0) from the processor I/F 116 of the host I/F circuit 11. At this time, the tag information (T1) stored in the first register 118 is also read together. The tag information (T1) is fetched together as attribute information of the read command (A0).

Next, the processor 12 copies the tag information (T1) to the second register 134 in the processor I/F 131 of the data buffer circuit 13. As a result, the count value "N=1" is stored in the second register 134 as the tag information (T1).

Next, the processor 12 instructs the memory I/F circuit 14 to read the read data (A0). The read data that is read is stored in the buffer memory 132.

The tag information comparison circuit 135 compares the tag information stored in the first register 118 of the tag information generation circuit 117 with the tag information stored in the second register 134 in the data buffer circuit 13 in accordance with the read request from the read control circuit 113. When the two pieces of tag information match each other and the amount of read data read into the buffer memory 132 exceeds the predetermined amount, the buffer management circuit 133 responds to the read control circuit 113 that the read data stored in the buffer memory 132 is readable (buffer ready response), and releases the waiting state of the read control circuit 113. Here, in the sequence example in FIG. 2, if the count value "N=1" is stored in both the first register and the second register, the pieces of tag information can be regarded as matching each other. However, since reading of the read data corresponding to the read command (A0) is not complete at this point, the read data is not output to the host 4.

Next, in this state, for example, it is assumed that the host I/F circuit 11 receives the read stop or end command from the external host 4. Such a situation occurs when processing of the memory system 1 is delayed with respect to the host 4. Specifically, such a situation may occur when there is a large amount of read data to be read and the waiting state of the read control circuit 113 continues for a long time. Alternatively, such a situation may occur when it takes time to return to command processing in a low power consumption state for the purpose of reducing power consumption of the memory system 1, or when the memory system 1 cannot keep up with a processing speed expected by the host 4 because the host 4 is relatively fast and the processor 12 is relatively slow.

When the host I/F circuit 11 receives the read stop or end command, the command and response processing circuit 112 returns a response to the host 4 via the host I/F 111. Then, the interrupt signal generation circuit 115 notifies the processor 12 of the reception interrupt of the read stop or end command.

Next, the host I/F circuit 11 receives the next read command (A1) from the external host 4. The read command (A1) is a command different from the previous read command (A0). When the read command (A1) is received via the host I/F 111, the command and response processing circuit 112 returns a response to the host 4 via the host I/F 111. The interrupt signal generation circuit 115 notifies the processor 12 of the reception interrupt of the read command (A1).

When the host I/F circuit 11 receives the read command (A1), the tag information generation circuit 117 operates to generate new tag information (T2) and stores the new tag information in the first register 118. For example, when the count value (N) is used for the tag information, a value of "N=2" is generated and stored.

Next, the read control circuit 113 starts the read request to the buffer management circuit 133. As described above, this sequence example is a case where the processing of the memory system 1 is delayed with respect to the host 4.

The tag information comparison circuit 135 compares the tag information stored in the first register 118 with the tag information stored in the second register 134 in accordance with the read request from the read control circuit 113. At this time, "N=2" updated as the count value of the new tag information corresponding to input of the new read command (A1) is stored in the first register 118. On the other hand, since the count value "N=1" of the tag information corresponding to the previous read command (A0) is stored in the second register 134 in the data buffer circuit 13, the tag information stored in the first register 118 and the tag information stored in the second register 134 do not match each other.

Therefore, the buffer management circuit 133 can control the read control circuit 113 so as not to transfer from the buffer memory 132. As described above, by comparing the tag information stored in the first register 118 with the tag information stored in the second register 134, it is possible to prevent old read data corresponding to the read command (A0) from being erroneously output to the host 4, instead of the new read data corresponding to the read command (A1).

Next, the processor 12 confirms the notification of a read stop or end command reception interrupt. Then, the processor 12 instructs the memory I/F circuit 14 to stop reading the read data (A0). Further, the processor 12 instructs to discard the read data (A0) read and stored in the data buffer circuit 13. Even when the notification of a read command (A1) reception interrupt is performed while such end process is being performed, the processor 12 continues the end process in priority.

After the end process is complete, the processor 12 confirms the notification of the read command (A1) reception interrupt. Then, the processor 12 fetches a detail of the read command (A1) from the processor I/F 116 of the host I/F circuit 11. At this time, the tag information (T2) stored in the first register 118 is also read together.

Next, the processor 12 copies the tag information (T2) to the second register 134 in the processor I/F 131 of the data buffer circuit 13. As a result, the count value "N=2" is stored in the second register 134.

Next, the processor 12 instructs the memory I/F circuit 14 to read the read data (A1). The read data that is read is stored in the buffer memory 132. Then, the buffer management circuit 133 compares the tag information stored in the first register 118 with the tag information stored in the second register 134 in accordance with the read request from the read control circuit 113. At this time, the count value "N=2" is stored in both the first register 118 in the tag information generation circuit 117 and the second register 134 in the data buffer circuit 13, and the tag information stored in the first register 118 and the tag information stored in the second register 134 match each other. Since the amount of read data corresponding to the read command (A1) read into the buffer memory 132 exceeds the predetermined amount, the read control circuit 113 is notified that the read data stored in the buffer memory 132 is readable.

When the read control circuit 113 is notified that the read data stored in the buffer memory 132 is readable, the read control circuit 113 outputs the read data (A1) from the buffer memory 132 to the external host 4 via the read data processing circuit 114 and the host I/F 111. As described above, according to the present embodiment, it is possible to prevent the read data (A0) corresponding to the previous read command (A0) from being erroneously output in response to the input of the read command (A1), and to output the correct read data (A1) corresponding to the read command (A1).

Figure 3:
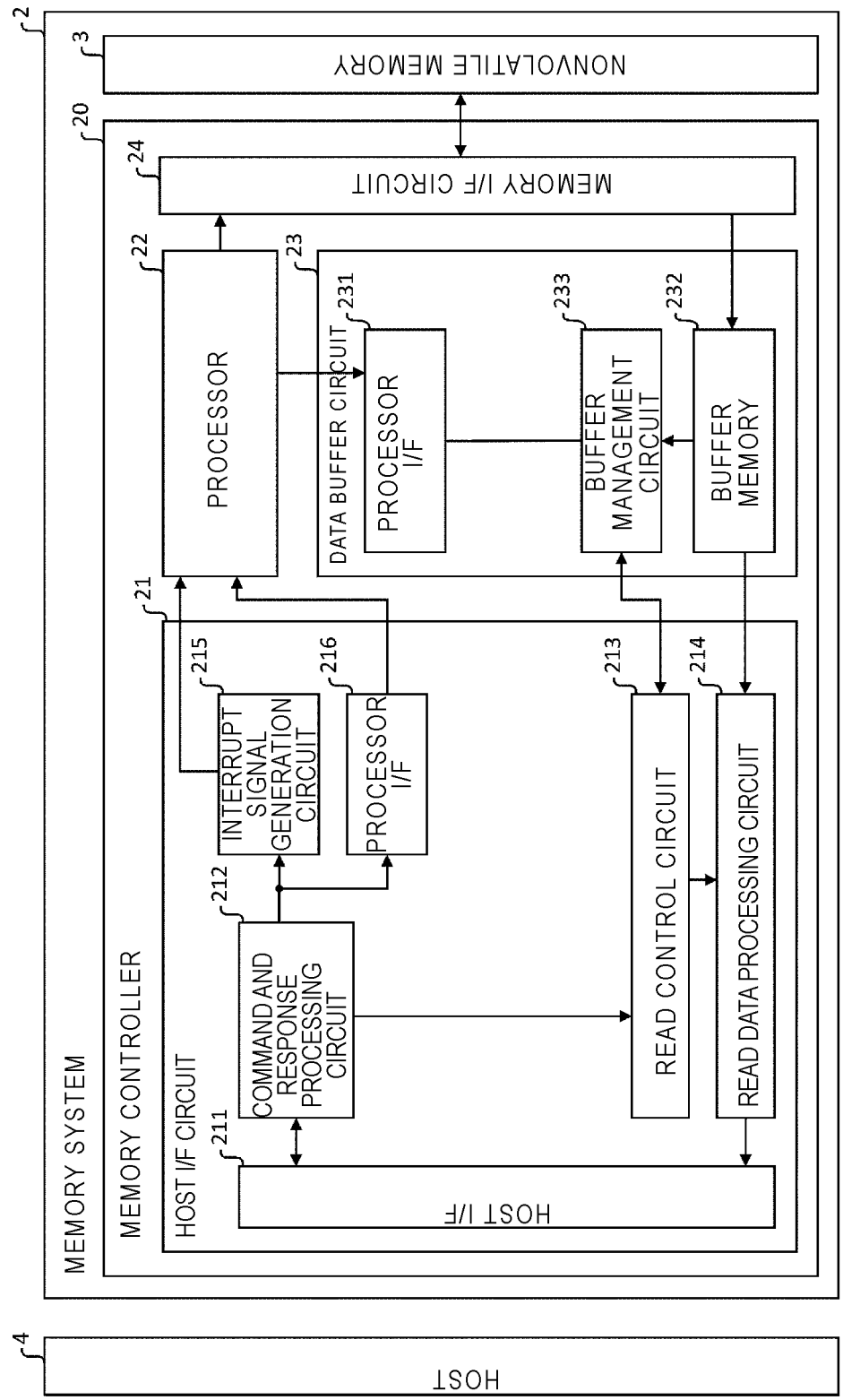
FIG. 3 is a block diagram illustrating an example of a configuration of a memory system according to a comparative example.

Next, a memory system 2 according to a comparative example will be described with reference to FIG. 3. FIG. 3 is a block diagram illustrating an example of a configuration of the memory system according to the comparative example.

In the memory system 2, a part of the configuration of a memory controller 20 is different from that of the memory controller 10 of the memory system 1. The memory controller 20 differs from the memory controller 10 in that the host I/F circuit 21 does not have a tag information generation circuit and a first register, or the data buffer 23 does not have a second register and a tag information comparison circuit. Other configurations are the same as those of the memory controller 10.

Figure 4:
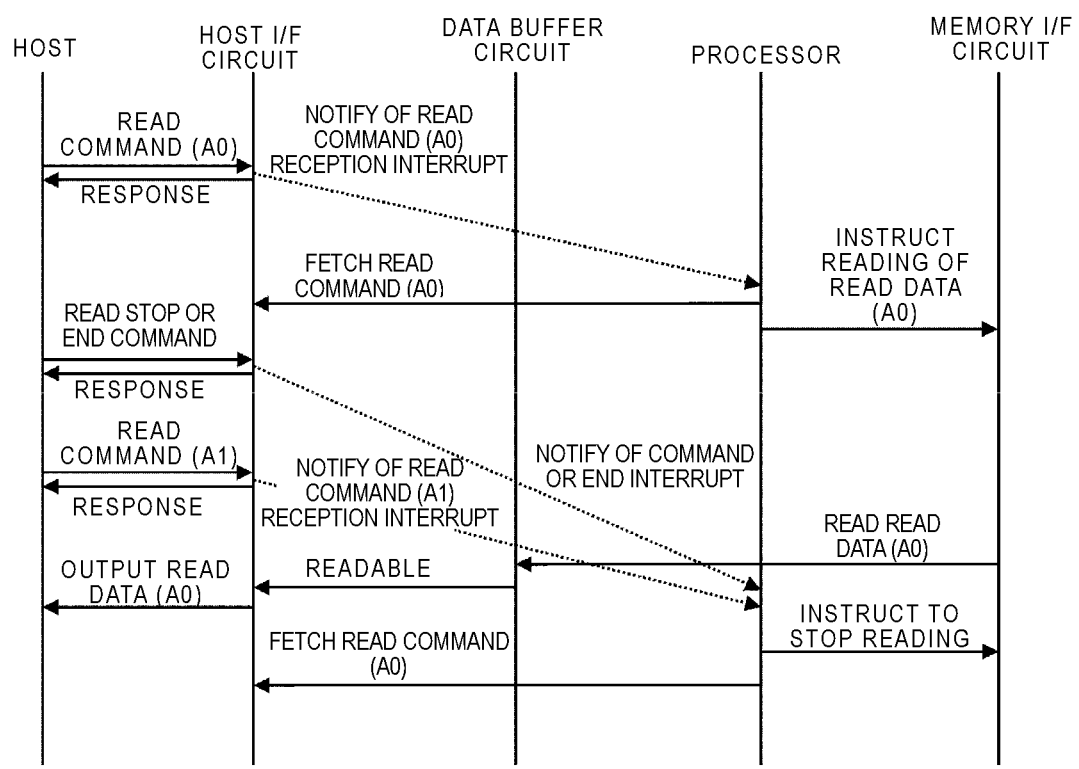
FIG. 4 is a diagram illustrating an operation sequence of the memory system according to the comparative example.

Next, an operation of the memory system 2 according to the comparative example will be described with reference to FIG. 4. FIG. 4 is a diagram illustrating an operation sequence of the memory system according to the comparative example. A description of the same operation as that of the memory system 1 according to the embodiment will be omitted.

The memory system 2 according to the comparative example does not have a circuit associated with tag information. Therefore, when an amount of the read data (A0) read into a buffer memory 232 exceeds a predetermined amount, a buffer management circuit 233 notifies a read control circuit 213 that the read data stored in the buffer memory 132 is readable.

The operation of the memory system 2 in FIG. 4 illustrates a case where a read stop or end command is received from the external host 4 after a start of reading the read data (A0) in the same situation and for the same reason as that of the memory system 1 in FIG. 2.

The operation of the memory system 2 according to the comparative example is similar until the amount of read data (A0) read into the buffer memory 232 exceeds the predetermined amount, except that the operation related to the tag information is not performed. Therefore, a description will be made from a time point when the amount of read data (A0) read into the buffer memory 232 exceeds the predetermined amount.

As described above, when the amount of read data (A0) read into the buffer memory 232 exceeds the predetermined amount, the buffer management circuit 233 notifies the read control circuit 213 that the read data stored in the buffer memory 132 is readable. When the read control circuit 213 is notified that the read data stored in the buffer memory 132 is readable, the read control circuit 213 outputs the read data (A0) from the buffer memory 232 to the external host 4 via a read data processing circuit 214 and a host I/F 211. However, a read command at this time is the read command (A1). Therefore, according to the comparative example, the erroneous read data (A0) is output in response to the read command (A1).

As described above, in the memory system 2 according to the comparative example, when processing of the memory system 2 is delayed with respect to the host 4, erroneous read data may be output in response to the read command. On the other hand, in the memory system 1 according to the present embodiment, the tag information stored in the first register 118 and the tag information stored in the second register 134 are compared before the amount of read data (A1) read into the buffer memory 132 exceeds the predetermined amount and the read control circuit 113 is notified that the read data stored in the buffer memory 132 is readable. By comparing the tag information, it is possible to check whether the read data read into the buffer memory 132 and the data requested by the read command match each other. Therefore, as shown in FIG. 2, even when the processing of the memory system 1 is delayed with respect to the host 4, it is possible to prevent a malfunction that a previous read data is erroneously output in response to a new read command, and then to output correct read data in response to the new read command. As a result, reliability of the operation of the memory system can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:
1. A memory controller, comprising:
a host interface circuit configured to be connected to a host device by a bus conforming to a memory card system specification;
a data buffer circuit comprising a buffer memory;
a tag information generation circuit configured to generate tag information associated with a command received by the host interface circuit from the host device; and
a first register in which the tag information generated by the tag information generation circuit is stored, and a second register into which the tag information stored in the first register is copied after the command is fetched from the host interface circuit for processing, wherein
when a read request is made from the host interface circuit to the data buffer circuit, the data buffer circuit returns read data stored in the buffer memory upon confirming that the tag information stored in the first register and the tag information stored in the second register match each other, and the data buffer circuit further includes a buffer management circuit, which receives the read request, and notifies the host interface circuit that the buffer memory is ready to return the read data upon confirming that the tag information stored in the first register and the tag information stored in the second register match each other.

2. The memory controller according to claim 1, wherein the buffer management circuit notifies the host interface circuit that the buffer memory is readable when a threshold amount of the read data is stored in the buffer memory.

3. The memory controller according to claim 1, wherein the data buffer circuit further includes a tag information comparison circuit, which performs a comparison of the tag information stored in the first register and the tag information stored in the second register to confirm that the tag information stored in the first register and the tag information stored in the second register match each other.

4. The memory controller according to claim 3, wherein the tag information generation circuit stores the tag information in the first register upon generating the tag information.

5. The memory controller according to claim 1, wherein the bus conforming to the memory card system specification is a serial peripheral interface (SPI) bus or an SD bus.

6. The memory controller according to claim 1, wherein the first register is provided in the host interface circuit.

7. The memory controller according to claim 6, wherein the first register is provided in the tag information generation circuit.

8. The memory controller according to claim 1, wherein the second register is provided in the data buffer circuit.

9. The memory controller according to claim 8, wherein the data buffer further includes an interface, and the second register is provided in the interface.

10. The memory controller according to claim 1, wherein the tag information generation circuit is a counter, and the tag information is a count value generated by the counter.

11. The memory controller according to claim 1, wherein the tag information is a read address of a read command received from the host device.

12. The memory controller according to claim 1, wherein the tag information is time information generated by the tag information generation circuit.

13. The memory controller according to claim 1, wherein the host interface circuit further comprises a read control circuit, and the data buffer circuit further comprises a tag information comparison circuit configured to compare the tag information stored in the first register and the tag information stored in the second register, and upon receiving the notification that the buffer memory is ready to return the read data, the read control circuit transmits the read data returned thereto by the data buffer circuit to the host device.

14. The memory controller according to claim 1, wherein the memory controller is configured to be connected to a non-volatile memory.

15. The memory controller according to claim 1, wherein when the host interface circuit receives a read command from the host device, the memory controller compares the tag information in the first register corresponding to the received read command with the tag information in the second register corresponding to the read data stored in the buffer memory.

* * * * *